United States Patent
Orr

(10) Patent No.: US 8,998,049 B1
(45) Date of Patent: Apr. 7, 2015

(54) VEHICLE DASH ACCESSORY HOLDING DEVICE

(71) Applicant: Ronald A. Orr, Kitchener (CA)

(72) Inventor: Ronald A. Orr, Kitchener (CA)

( * ) Notice: Subject to any disclaimer, the term of this patent is extended or adjusted under 35 U.S.C. 154(b) by 0 days.

(21) Appl. No.: 14/188,320

(22) Filed: Feb. 24, 2014

(51) Int. Cl.
*B60R 7/06* (2006.01)
*B60R 11/02* (2006.01)

(52) U.S. Cl.
CPC .......... *B60R 11/0258* (2013.01); *Y10S 224/929* (2013.01)

(58) Field of Classification Search
CPC ...... B60R 7/06; B60R 11/02; B60R 11/0241; B60R 2011/005; B60R 2011/0075; B60R 2011/0007
USPC ......... 224/483, 539, 540, 543, 555, 567, 571, 224/929, 901.8; 701/491; 296/37.12; D12/415
See application file for complete search history.

(56) References Cited

U.S. PATENT DOCUMENTS

| | | | | |
|---|---|---|---|---|
| 4,846,382 | A | * | 7/1989 | Foultner et al. ............ 224/483 |
| 5,660,311 | A | * | 8/1997 | Soltau ........................ 224/483 |
| 6,129,321 | A | | 10/2000 | Minelli et al. |
| 6,170,955 | B1 | * | 1/2001 | Campbell et al. ........... 359/509 |
| 6,529,381 | B1 | | 3/2003 | Schoenfish |
| D508,016 | S | * | 8/2005 | Clark ......................... D12/415 |
| 7,088,574 | B2 | | 8/2006 | Greenidge et al. |
| 7,142,980 | B1 | | 11/2006 | Laverick et al. |
| D653,975 | S | | 2/2012 | Anderson |
| 2002/0100782 | A1 | * | 8/2002 | Marvin ....................... 224/483 |
| 2010/0254014 | A1 | | 10/2010 | Trinh et al. |

* cited by examiner

*Primary Examiner* — Brian D Nash
*Assistant Examiner* — Corey Skurdal

(57) ABSTRACT

A vehicle dash accessory holding device holds an accessory such as a global positioning device while providing an appearance that the device is integrated into the original equipment of the vehicle. The device includes a housing having a perimeter wall extending between a front end and a back end. The perimeter wall defines an open front face at the front end of the housing. A top slot extends through the perimeter wall. Each of a plurality of tabs is coupled to and extends from the perimeter wall. Each tab is curved to extend in front of the open front face of the housing wherein the tabs support an extrinsic device in the front end of the housing. A fastener is coupled to a bottom face of the housing for coupling the housing to a dash of a vehicle.

7 Claims, 3 Drawing Sheets

VEHICLE DASH ACCESSORY HOLDING DEVICE

BACKGROUND OF THE DISCLOSURE

Field of the Disclosure

The disclosure relates to holding devices and more particularly pertains to a new holding device for holding an accessory such as a global positioning device while providing an appearance that the device is integrated into the original equipment of the vehicle.

SUMMARY OF THE DISCLOSURE

An embodiment of the disclosure meets the needs presented above by generally comprising a housing having a perimeter wall extending between a front end and a back end. The perimeter wall defines an open front face at the front end of the housing. A top slot extends through the perimeter wall. Each of a plurality of tabs is coupled to and extends from the perimeter wall. Each tab is curved to extend in front of the open front face of the housing wherein the tabs support an extrinsic device in the front end of the housing. A fastener is coupled to a bottom face of the housing for coupling the housing to a dash of a vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
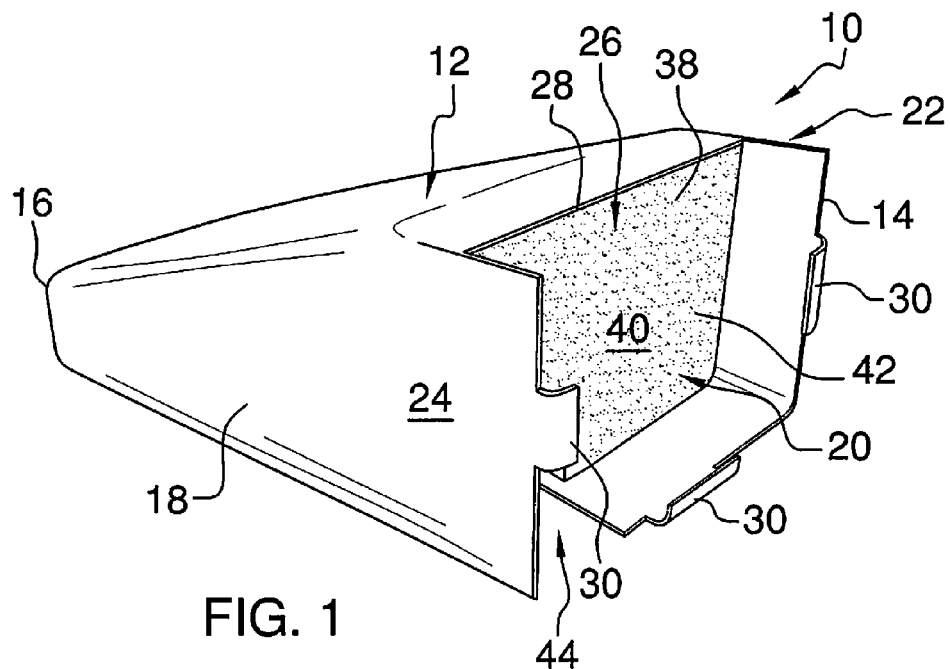
FIG. 1 is a top front side perspective view of a vehicle dash accessory holding device according to an embodiment of the disclosure.
Figure 2:
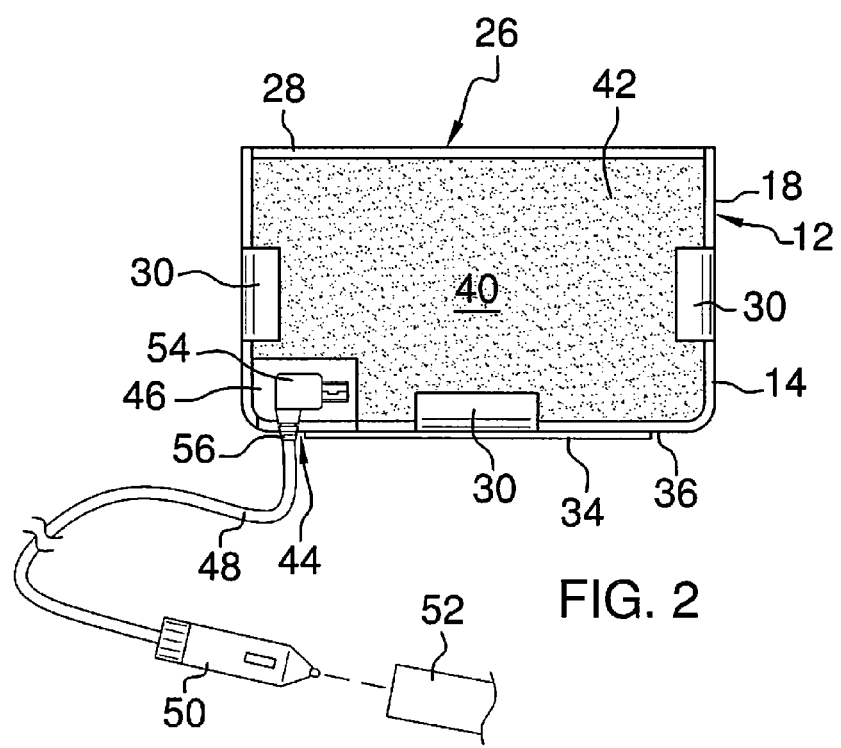
FIG. 2 is a front view of an embodiment of the disclosure.
Figure 3:
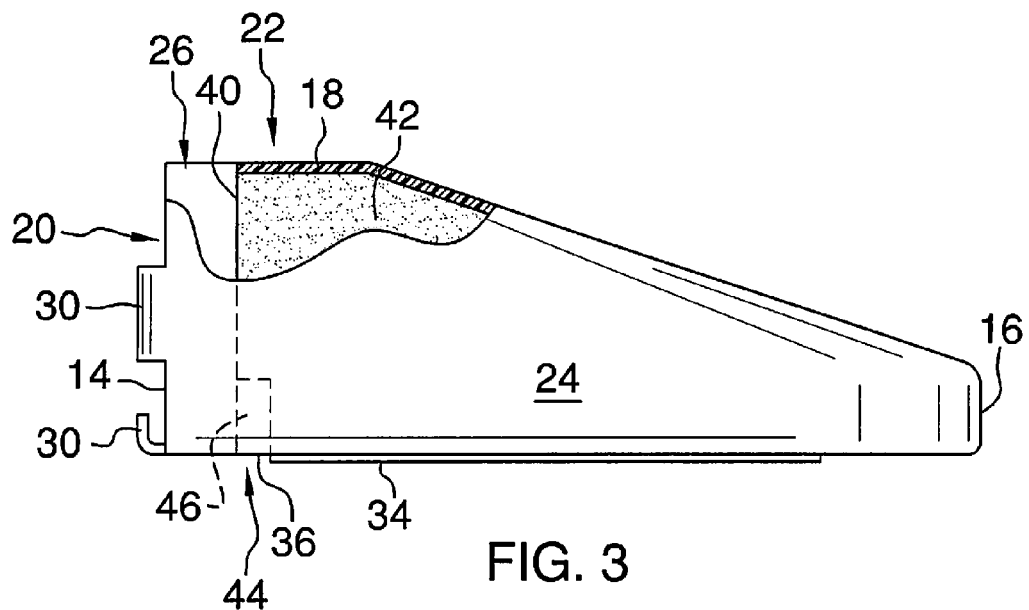
FIG. 3 is a partial cut-away side view of an embodiment of the disclosure.
Figure 4:
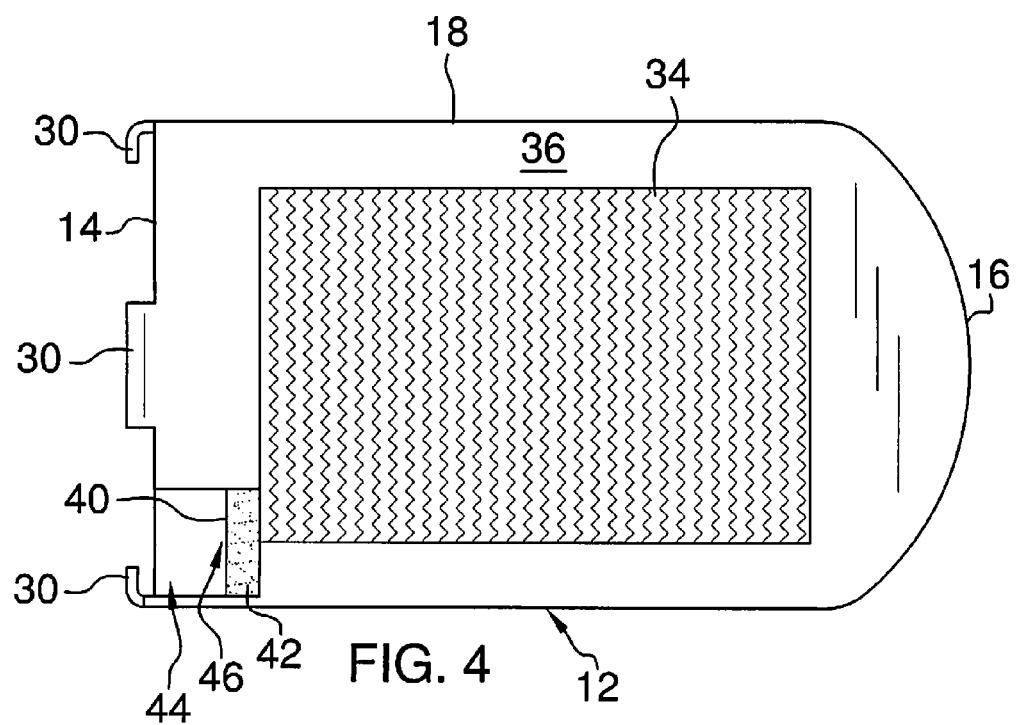
FIG. 4 is a bottom view of an embodiment of the disclosure.
Figure 5:
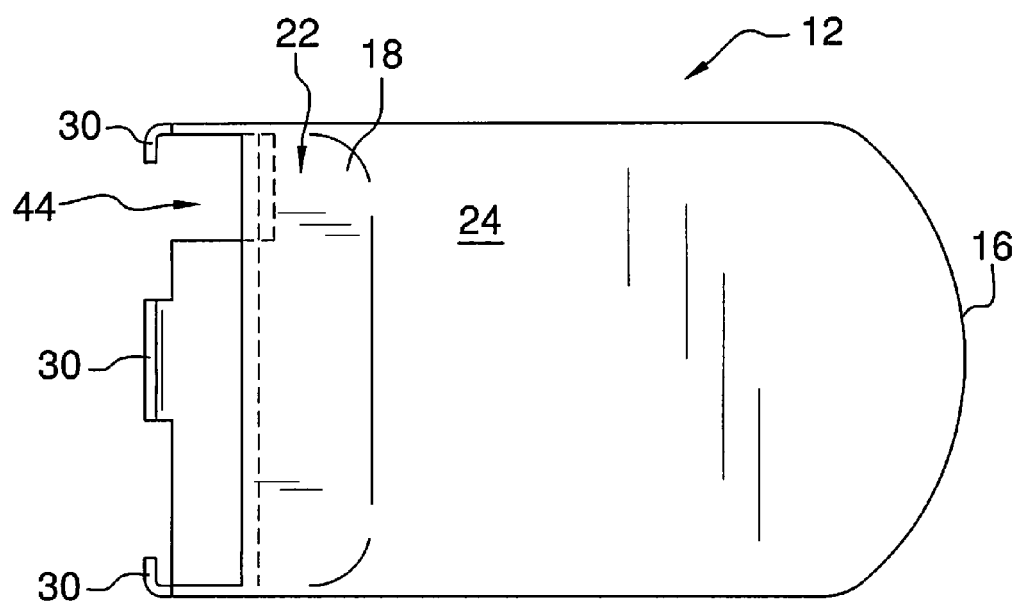
FIG. 5 is a top view of an embodiment of the disclosure.
Figure 6:
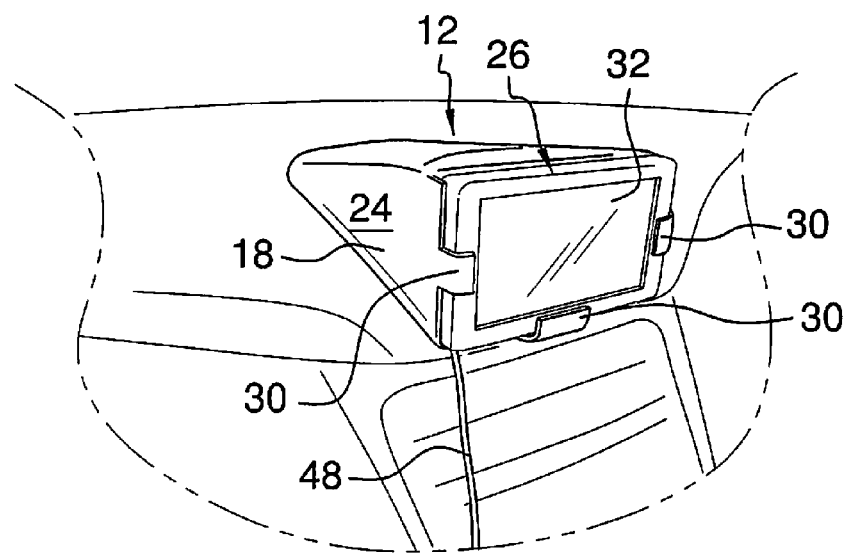
FIG. 6 is a top front side perspective view of an embodiment of the disclosure in use.

With reference now to the drawings, and in particular to FIGS. 1 through 6 thereof, a new holding device embodying the principles and concepts of an embodiment of the disclosure and generally designated by the reference numeral 10 will be described.

As best illustrated in FIGS. 1 through 6, the vehicle dash accessory holding device 10 generally comprises a housing 12 having a front end 14, a back end 16, and a perimeter wall 18 extending between the front end 14 and the back end 16. The perimeter wall 18 defines an open front face 20 at the front end 14 of the housing 12. The perimeter wall 18 may taper extending from a front portion 22 of the housing 12 towards the back end 16 of the housing 12. A fastener 34 is coupled to a bottom face 36 of the housing 12. The fastener 34 is configured for coupling the housing 12 to a dash of a vehicle. An exterior surface 24 of the housing 12 is configured to aesthetically match an interior of the vehicle wherein the housing 12 appears to be an original part of the interior of the vehicle.

A top slot 26 extends through the perimeter wall 18. The top slot 26 may extend fully across a top edge 28 of the housing 12. Each of a plurality of tabs 30 is coupled to and extends from the perimeter wall 18. Each tab 30 is curved to extend in front of the open front face 20 of the housing 12 wherein the tabs 30 are configured for supporting an extrinsic device 32 in the front end 14 of the housing 12. An interior wall 38 extends through the housing 12. The interior wall 38 is positioned in spaced relationship to the open front face 20 opposite the tabs 30 wherein the interior wall 38 is positioned to support the extrinsic device 32 in an upright position between the interior wall 38 and the tabs 30. The interior wall 38 is formed by a front face 40 of an insert 42 positioned in the housing 12. The interior wall 38 may comprise a compressible foam material or the like to cushion and retain the extrinsic device 32 in the housing 12.

A bottom slot 44 extends through the perimeter wall 18. The bottom slot 44 extends inwardly from the front end 14 of the housing 12. A cavity 46 in the interior wall 38 is aligned with the bottom slot 44. A power cord 48 has a first end 50 configured for coupling to a power source 52 such as a vehicle power port or the like. A connector 54 is coupled to a second end 56 of the power cord 48. The connector 54 is positionable in the cavity 46 and configured for being selectively coupled to the extrinsic device 32 while the extrinsic device 32 is positioned in the front end 14 of the housing 12.

In use, the housing 12 is positioned in a desired location in the interior of the vehicle. The extrinsic device 32 is inserted into the housing 12 through the top slot 26 and held in place by the tabs 30 and the interior wall 38. The extrinsic device 32 is of the type conventionally known and used by a touch-screen or the like such that the extrinsic device 32 is usable and has the outward appearance of being fixedly incorporated into the interior of the vehicle. The appearance of being incorporated into the vehicle in this manner inhibits potential theft by giving the appearance of a device which is less easily removed from the vehicle than a loose device or one connected to only a power cord.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle dash accessory holding device comprising:
   a housing having a front end, a back end, and a perimeter wall extending between said front end and said back end, said perimeter wall defining an open front face at said front end of said housing;
   a top slot extending through said perimeter wall;
   a plurality of tabs, each said tab being coupled to and extending from said perimeter wall, each said tab being curved to extend in front of said open front face of said housing wherein said tabs are configured for supporting an extrinsic device in said front end of said housing;
   a fastener coupled to a bottom face of said housing, said fastener being configured for coupling said housing to a dash of a vehicle;
   an interior wall extending through said housing, said interior wall being positioned in spaced relationship to said open front face opposite said tabs wherein said interior wall is positioned to support an extrinsic device in an upright position between said interior wall and said tabs;
   a bottom slot extending through said perimeter wall, said bottom slot extending inwardly from said front end of said housing; and
   a cavity in said interior wall, said cavity being aligned with said bottom slot.

2. The device of claim 1, further comprising said top slot extending fully across a top edge of said housing.

3. The device of claim 1, further comprising said perimeter wall tapering extending from a front portion of said housing towards said back end of said housing.

4. The device of claim 1, further comprising said interior wall comprising a compressible foam material.

5. The device of claim 1, further comprising:
   a power cord having a first end configured for coupling to a power source; and
   a connector coupled to said second end of said power cord, said connector being positioned in said cavity, said connector being configured for selectively coupling to the extrinsic device while the extrinsic device is positioned in said front end of said housing.

6. The device of claim 1, further comprising said interior wall being formed by a front face of an insert positioned in said housing.

7. A vehicle dash accessory holding device comprising:
   a housing having a front end, a back end, and a perimeter wall extending between said front end and said back end, said perimeter wall defining an open front face at said front end of said housing, said perimeter wall tapering extending from a front portion of said housing towards said back end of said housing;
   a top slot extending through said perimeter wall, said top slot extending fully across a top edge of said housing;
   a plurality of tabs, each said tab being coupled to and extending from said perimeter wall, each said tab being curved to extend in front of said open front face of said housing wherein said tabs are configured for supporting an extrinsic device in said front end of said housing;
   a fastener coupled to a bottom face of said housing, said fastener being configured for coupling said housing to a dash of a vehicle;
   an exterior surface of said housing being configured to aesthetically match an interior of the vehicle wherein said housing appears to be an original part of the interior of the vehicle;
   an interior wall extending through said housing, said interior wall being positioned in spaced relationship to said open front face opposite said tabs wherein said interior wall is positioned to support an extrinsic device in an upright position between said interior wall and said tabs, said interior wall being formed by a front face of an insert positioned in said housing, said interior wall comprising a compressible foam material;
   a bottom slot extending through said perimeter wall, said bottom slot extending inwardly from said front end of said housing;
   a cavity in said interior wall, said cavity being aligned with said bottom slot;
   a power cord having a first end configured for coupling to a power source; and
   a connector coupled to said second end of said power cord, said connector being positioned in said cavity, said connector being configured for selectively coupling to the extrinsic device while the extrinsic device is positioned in said front end of said housing.

\* \* \* \* \*